United States Patent
Liu

(10) Patent No.: US 7,400,273 B2
(45) Date of Patent: *Jul. 15, 2008

(54) SYSTEM FOR IMPROVING MEMORY INTERFACE DATA INTEGRITY IN PLDS

(75) Inventor: Hui Liu, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/458,962

(22) Filed: Jul. 20, 2006

(65) Prior Publication Data

US 2006/0290542 A1    Dec. 28, 2006

Related U.S. Application Data

(62) Division of application No. 11/142,732, filed on May 31, 2005, now Pat. No. 7,102,544.

(51) Int. Cl.
*H03M 7/00* (2006.01)
(52) U.S. Cl. .......................... 341/51; 341/50
(58) Field of Classification Search ............. 341/50–75
See application file for complete search history.

(56) References Cited

U.S. PATENT DOCUMENTS 5,206,947 A * 4/1993 Edem et al. .................. 707/7
5,319,651 A * 6/1994 Edem et al. .................. 714/808
5,349,684 A * 9/1994 Edem et al. .................. 707/1
5,855,016 A * 12/1998 Edem et al. .................. 707/7
7,102,544 B1 * 9/2006 Liu .............................. 341/51

* cited by examiner

*Primary Examiner*—Lam T Mai
(74) *Attorney, Agent, or Firm*—Martine Penilla & Gencarella, LLP

(57) ABSTRACT

An integrated circuit (IC) for optimizing data presentation to an external memory interface bus is provided. The IC is in communication with the external memory via the external memory interface bus. The IC includes an encoder that may encode the data that are being sent to an external memory. The encoder encodes the data based on the logic value of the majority of bits in the data. The encoder is capable of setting a status bit to indicate that the data are encoded. Further connected in series with the encoder is a parity generator that sets the parity bit logic value based on whether the number of logic 1s in the data, along with the status bit, is even or odd. The IC also includes a parity checker to detect whether any error occurred in the data during transmission. The decoder within the IC decodes the data to the original data.

6 Claims, 5 Drawing Sheets

SYSTEM FOR IMPROVING MEMORY INTERFACE DATA INTEGRITY IN PLDS

CLAIM OF PRIORITY

This Application is a divisional application and claims priority from U.S. patent application Ser. No. 11/142,732, filed on May 31, 2005 now U.S. Pat. No. 7,102,544, entitled "METHOD AND SYSTEM FOR IMPROVING MEMORY INTERFACE DATA INTEGRITY IN PLDS," which is herein incorporated by reference in its entirety for all purposes.

BACKGROUND

Description of the Related Art

A programmable logic device (PLD) generally includes at least one memory, which may be located external to or embedded in the PLD. When the memory is located external to the PLD, the PLD is provided with an external memory interface bus that can be used for communicating with the external memory. The data are transmitted to/from the PLD from/to the external memory via the external memory interface bus. During transmission, bits in the data might be switching states. When a large number of bits in the data simultaneously switch states, this can result in noise. The effect of simultaneous switching states is commonly referred to as a simultaneous switching output (SSO) effect. The noise generated by the SSO effect can cause signal integrity problems thereby causing corruption of data. Additionally, the error detection schemes used in digital circuits generally do not provide any means for detecting the errors, which may occur to bits in the data that indicate such process as encoding.

Accordingly, there exists a need for a system and a method for a PLD with an external memory that minimizes SSO effect. Also, there exists a need to detect errors that may occur to bits in the data that indicate such process as encoding.

SUMMARY

Broadly speaking, the present invention fills these needs by providing a method and system for presenting data to an external memory interface bus in an optimized way. According to the embodiments of the invention, the data, which are sent from a PLD to an external memory, are encoded based on the logic value of the majority bits. Further, the error detection logic is connected in series with the encoder so that the status bit signifying the encoding may also be included in the error detection scheme. Therefore, any error that may occur in the status bit may also be detected. Also, the structure formed by the combination of having encoding in series with the error detection scheme reduces the SSO effect.

In one aspect of the invention, an integrated circuit (IC) for optimizing data presentation to an external memory interface bus is provided. The IC is in communication with the external memory via the external memory interface bus. The IC includes an encoder that may encode the data that are being sent to an external memory. The encoder encodes the data based on the logic value of the majority of bits in the data. The encoder sets a status bit to indicate that the data are encoded. Further connected in series with the encoder is a parity generator that sets the parity bit logic value based on whether the number of logic 1s in the data, including the status bit, is even or odd. The IC also includes a parity checker to detect whether any error occurred in the data during transmission. The decoder within the IC decodes the data to the original data. The decoder is connected in series with the parity checker.

In another aspect of the invention, a method for optimizing data presentation on an external memory interface bus for a programmable logic device (PLD) is provided. The method includes encoding the data to be sent to an external memory and setting the status bit to a particular logic value to indicate that the data are encoded. The determination to encode is based on the logic value of the majority of bits in the data. The encoding may involve inverting the data bits. Subsequent to encoding, the data parity bit is set to a particular logic value based on a number of particular logic value types in the data along with the status bit. The optimized data are sent to the external memory through the external memory interface bus.

A method for minimizing a simultaneously switching output (SSO) effect on an external memory interface bus is provided. The method includes counting the number of logic 1s in the data to be sent to an external memory. The data are encoded if the number of logic 1s in the data is more than half the number of bits in the data. Then, the status bit is set to a particular logic value to indicate that the data are encoded and subsequently require decoding. In the same token, if the majority of bits in the data are not logic 1s, then the data are not encoded. Thereafter, the parity generator sets the parity bit based on whether the number of logic 1s in the data, and the status bit combined, is even or odd.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention for optimized data presentation to an external memory interface bus is provided. The embodiments of the present invention monitor the bits in the data, and based on the type of bits that the majority of the bits in the data belong to, determine whether the data are to be encoded. When the data are encoded, the status bit is set to a particular logical value. After that, the parity generator counts the number of logic high values, e.g., 1s in the data, including the status bit, and sets the parity bit to a one or a zero based on whether the number of logical high values in the data is even or odd. The parity generator generates the parity bit in series with the encoder scheme, which not only helps to ensure integrity of the data but also ensures the integrity of the status bit.

Figure 1:
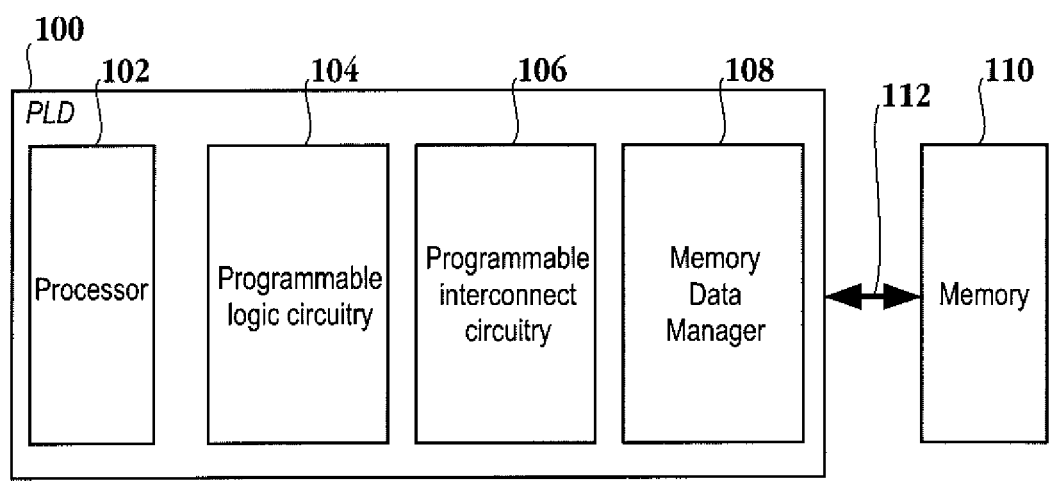
FIG. 1 is a high-level diagram of a PLD including an external memory in accordance with an embodiment of the present invention.

FIG. 1 shows a general block diagram of a PLD 100 in accordance with an embodiment of the present invention. PLD 100 includes processor 102, programmable logic circuitry 104, programmable interconnect circuitry 106, and memory data manager 108. PLD 100 illustrated herein may include other blocks and circuitry, as persons of ordinary skill in the art understand. Examples of such circuitry include clock generation and distribution circuits, communication circuitry and/or controllers, input/output circuitry, and the like. As one skilled in the art should understand, the PLD 100 may include more than one processor. Additionally, processor 102 may couple to other blocks and circuits within or external to the PLD 100. Processor 102 may receive data from circuits within or external to the PLD 100 and process the information in a variety of ways.

Programmable logic circuitry 104 may include a varying number of logic elements (LEs) (not shown), which are basic building blocks of a PLD. Programmable logic circuitry may further include look up tables (LUT), product-term logic, multiplexers, logic gates, registers, memory and the like, that are necessary elements that perform desired logic functions. Programmable interconnect circuitry 106 couples to programmable logic circuitry 104 and provides configurable interconnects between various elements within the programmable logic circuitry 104 and other circuitry within or outside the PLD. Although shown as a block, the interconnect circuitry 106 may represent a plurality of signal conductors and may be dispersed throughout PLD 100.

Memory data manager 108 communicates with external memory 110 through external memory interface bus 112. Examples of external memory 110 may include random access memory (RAM), dynamic random access memory (DRAM), synchronous DRAM (SDRAM), magnetic RAM (MRAM), static RAM (SRAM), FLASH, programmable ROM (PROM), erasable PROM (EPROM), dual-in-line memory modules (DIMMs), etc. It should be appreciated that the external memory interface bus 112 may be a digital interface bus. In addition, one skilled in the art should understand that external memory interface bus 112 might be of any suitable size.

When memory data manager 108 sends or receives data to/from the external memory 110, the bits in the data may switch states from logic 1 to logic 0 or logic 0 to logic 1 simultaneously, while being transmitted on external memory interface bus 112. This simultaneous switching of states can cause the SSO effect. Therefore, the embodiments of the present invention present the data to external memory interface bus 112 in an optimized manner in order to minimize the number data bits switching states simultaneously.

Figure 2:
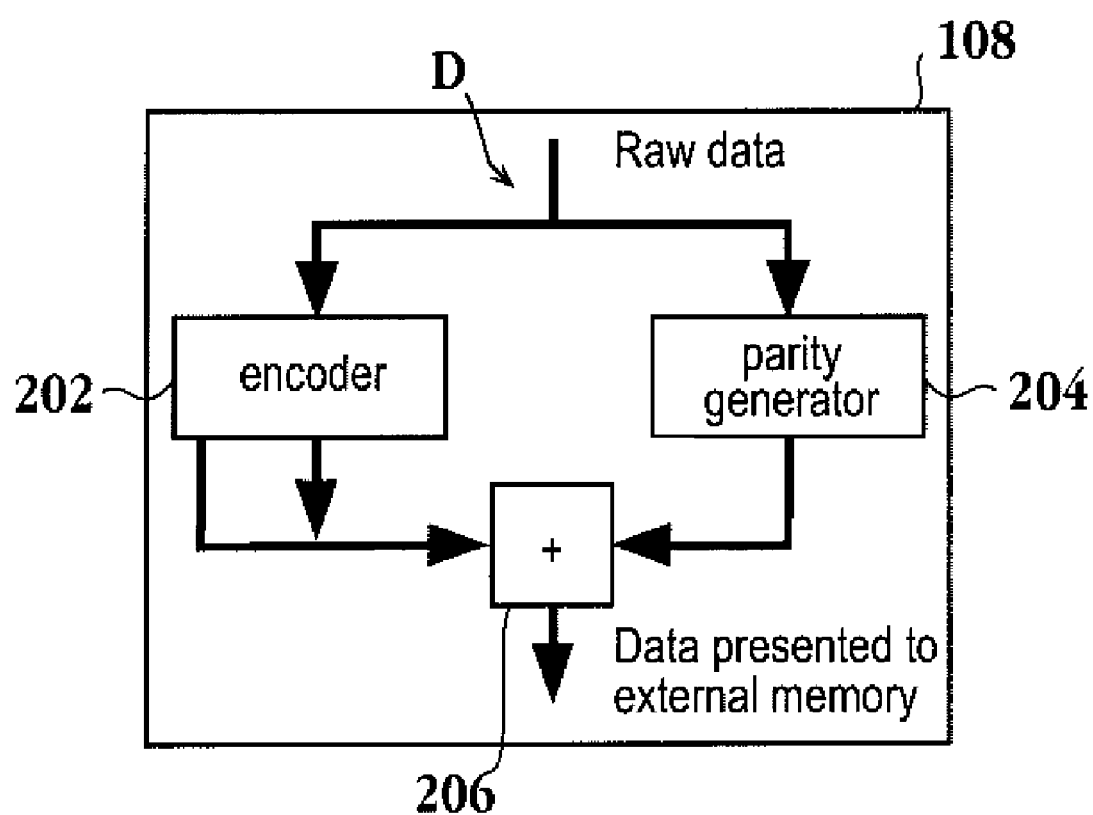
FIG. 2 shows a block diagram of a memory data manager.

FIG. 2 illustrates a block diagram of the memory data manager 108. Memory data manager 108 includes encoder 202 and parity generator 204 in parallel with each other. Raw data D are simultaneously sent to both the decoder 202 and the parity generator 204. The parity bit generated by the parity generator 204 is combined with the output data from encoder 202 at combiner 206 and are presented to the external memory 110 of FIG. 1 via external memory interface bus 112 of FIG. 1. One of the drawbacks of this arrangement is that the status bit generated by the encoder 202, to indicate encoding of the data, is not included in the raw data D sent to the parity generator 204. Thus, any error that may occur with the status bit will go undetected.

Figure 3:
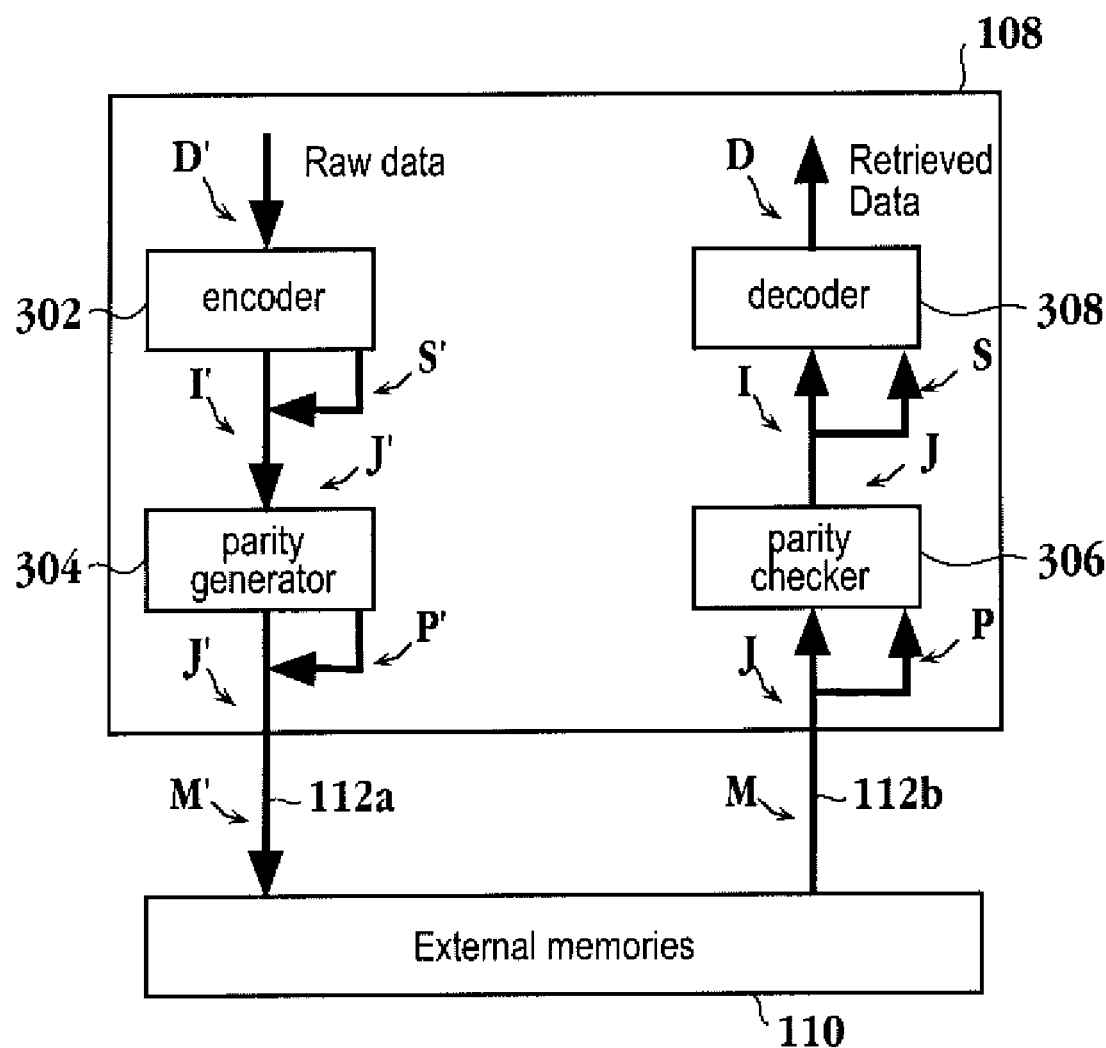
FIG. 3 illustrates a block diagram of a memory data manager in accordance with an embodiment of the present invention.

FIG. 3 illustrates a block diagram of a memory data manager 108 in accordance with an embodiment of present invention. Memory data manager 108 includes an encoder 302, parity generator 304, parity checker 306, and decoder 308. Memory data manager 108 is in communication with external memory 110 via external memory interface bus 112(a) and 112(b). Even though shown as two buses, external memory interface buses 112(a) and 112(b) may be a single bus. Raw data D' are sent from memory data manager 108 to the external memory 110. When the majority of bits in raw data D' may be classified as a particular type of logical value, the data being sent gets encoded by the encoder 302. The data from the encoder are shown as data I'.

As described above, a large number of bits switching states can lead to the SSO effect. Therefore, the encoder 302 encodes the data to prevent the majority of bits in the data from having a logical high value. The encoder 302 is also programmed to set a status bit S' to logic 1, to indicate that the data are encoded. Data I' and status bit S' are combined to form data J'. If the majority of the bits in the data are not of a particular logic type then the data are not encoded by the encoder 302 and the status bit S' is set to logic 0. One skilled in the art should understand that encoder 302 may be programmed to set the status bit S' to either 0 or 1 to indicate that the data are encoded.

Still referring to FIG. 3, memory data manager 108 includes parity generator 304. Parity generator 304 generates a parity bit P' based on the number of logic 1s in the data J'. Data J' and parity bit P' form data M'. In one embodiment, parity generator 304 is an odd parity generator, which implies that the parity generator 304 counts the number of logical high values, i.e., logical 1s in this case, in the data and sets parity bit P' to a logical high value if the number of logical high values in the data are odd. Conversely, if the number of logical high values in the data are even, the parity generator 304 sets the parity bit P' to a logical low value. In another embodiment, parity generator 304 is an even panty generator, in which case the parity generator 304 counts the number of logical high values in the data and sets the parity bit P' to logical high value if the number of logical high values in the data are even.

As can be seen in FIG. 3, encoder 302 and parity bit generator 304 are connected in series. Therefore, the parity bit generator 304 sets the parity bit P' based on the number of logical high values in the data J' inclusive of the status bit S' and data I'. Thus, any error that may occur in the status bit S' can be detected. Accordingly, when a request is generated within processor 102 of FIG. 1 to send data to external memory 110, the data M' of FIG. 3 is presented to the external memory interface bus 112(a) with a status bit S' and the parity bit P' set to a certain logic value so that any error that may occur due to the noise generated by the SSO effect can be detected. One skilled in the art should understand that even though a parity bit scheme is described above, other forms of error detection schemes may be used in series with the encoder for detecting error, such as a Hamming code.

Subsequently, when a request is generated within processor 102, of FIG. 1, to retrieve the data stored in external memory 110, the data M of FIG. 3 stored in external memory 110 are sent to parity checker 306 within memory data manager 108. Data M include status bit S, parity bit P, and data I. The data M which are retrieved from external memory 110 may or may not be the same as the data M' that were presented to the external memory interface bus 112(a). For example, if an error has occurred, then the data M will be different from the data M'. The parity checker 306 separates data M to parity bit P and data J. The parity checker 306 further checks the parity bit P to determine if data J received from the external memory 110 have any parity error. For example, in case of an odd parity checker, if the number of logical high values in data J is odd, and the parity bit P is a logical high value, which implies there is no error in the data. Similarly, if the number of logical high values in data J is even and the parity bit P is a logical low value, then this implies no error has occurred during transmission. One skilled in the art will appreciate that if the number of logical high values and the parity bit logical value do not correspond, then an error will be generated.

FIG. 3 is further shown to include decoder 308 connected in series with the parity checker 306. Decoder 308 separates data J to get status bit S and data I. Decoder 308 further checks the status bits to determine whether the data have been encoded. If the status bit S indicates that the data have been encoded, then the decoder 308 decodes the data to get data D. On the other hand, if status bit S indicates that the data have not been encoded, then the data I are not decoded by the decoder 308 i.e., the data D are the same as data I. In one embodiment, decoder 308 does not decode the data if the parity checker determines that an error has occurred in the data. Alternatively, the decoder 308 may decode the data even if an error has occurred so that the design engineers can determine where the error is and find ways to recover the data. One skilled in the art will appreciate that the same convention described above, with respect to FIG. 3, may be used consistently with logical low values. For example, the encoder 302 may be set up to encode the data if the majority of the bits in the data are logical low values, e.g., a logical 0.

Figure 4:
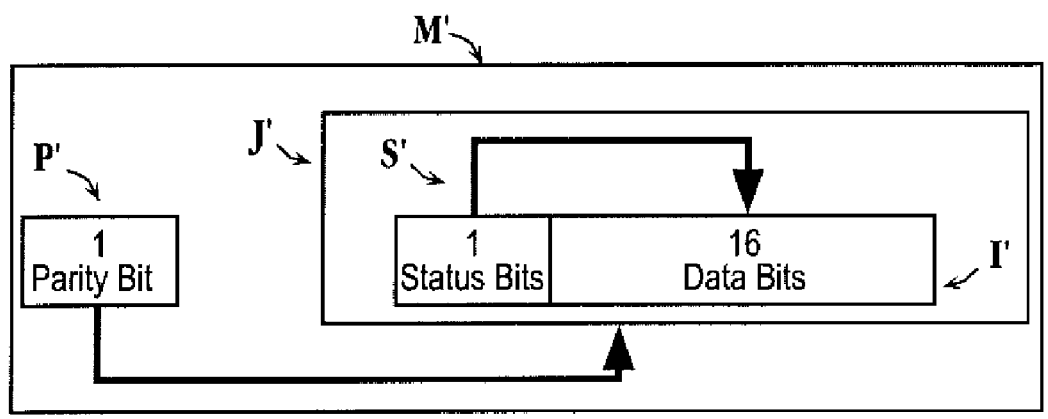
FIG. 4 shows an exemplary optimized data, as presented to the external memory interface bus, in accordance with an embodiment of the invention.

FIG. 4 shows an exemplary data structure for data M', as presented to the external memory interface bus 112(a), described in FIG. 3 in accordance with an embodiment of the invention. Data M', as shown, include parity bit P', status bit S', and data bits I'. One skilled in the art should understand that, even though data M' are shown to include total of 18 bits the number of bits in data M' can vary depending on the external memory interface bus size. Thus, the 18 bit size depicted in FIG. 4 is exemplary and not meant to be limiting. As described above, parity bit P' is set to a particular logical value based on the number of logical high values in data J', which includes the status bit S' and data bits I'. Consequently, errors that may occur to status bit during transmission can be detected.

Figure 5:
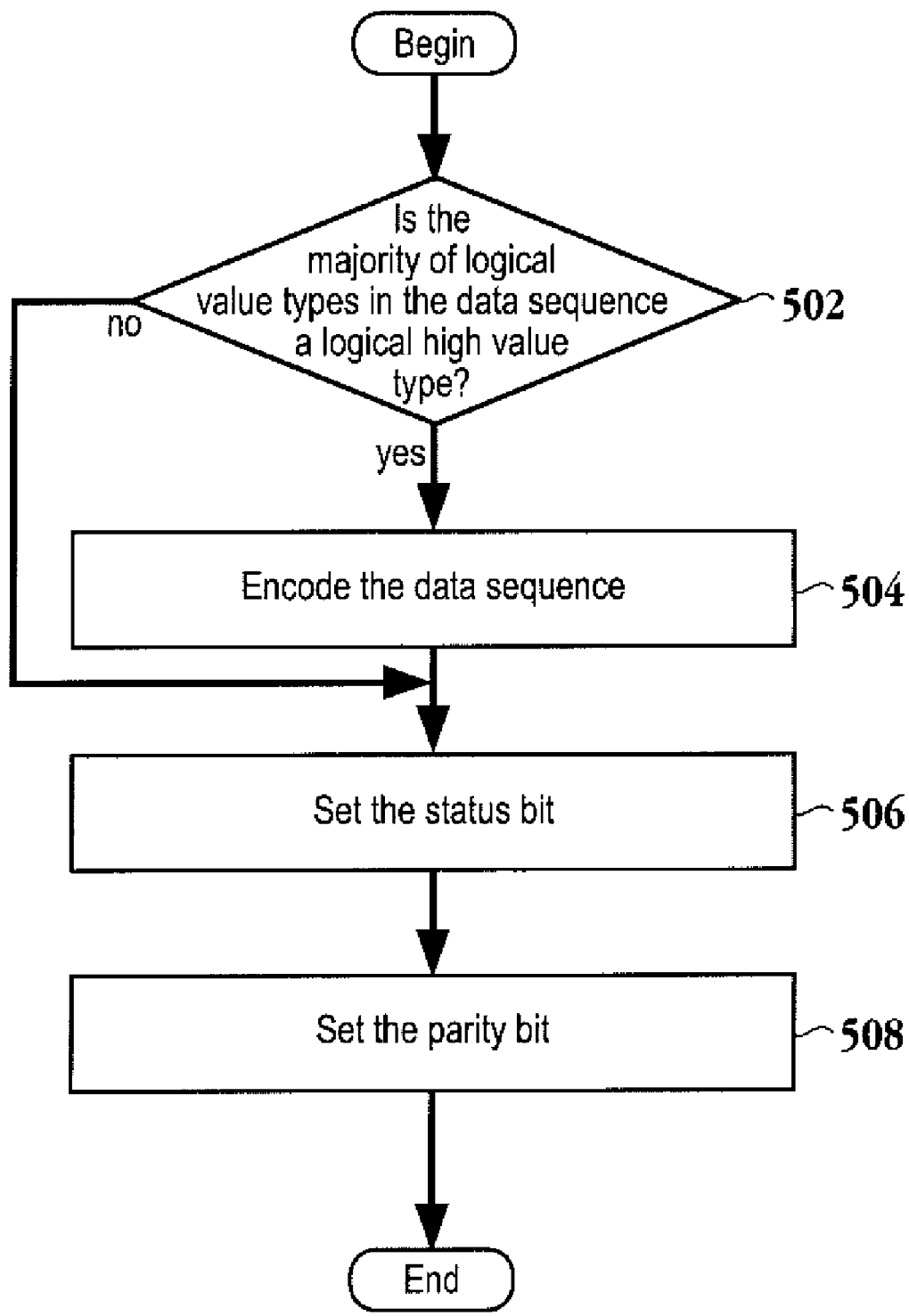
FIG. 5 is a flow chart illustrating the method of operations involved in providing an optimized data presentation to an external memory interface bus in accordance with an embodiment of the invention.

FIG. 5 is a flow chart illustrating the method of operations involved in providing an optimized data presentation to an external memory interface bus, in accordance with an embodiment of the invention. The method begins with operation 502, where a determination is made as to whether the majority of bits within the data sequence are of logical high value or logical low value. If the majority of bits are of logical high values, then the data sequence is encoded as described in operation 504. In one embodiment, the encoding involves inverting the bits in the data. Inverting, as described herein, involves changing the logical high values to logical low values and vice versa. Once the data sequence is encoded, the status bit is set to a particular logic value as indicated in operation 506. As mentioned above, the status bit may be set to either a logical high or low value.

If the majority of bits in the data sequence is not a logical high value type in operation 502, then the data sequence is not encoded and the method advances to operation 506, where the status bit is set accordingly. Thus, if the majority of bits in the data sequence are not a logical high value type, then the data is maintained in an unencoded format. Next, in operation 508, the parity bit is set either to a logical high or logical low value based on the number of logical high values in the data sequence. As indicated above, the parity bit value is computed based on the number of logical high values in the data sequence, which includes the status bit. Thus, the parity bit not only detects any error that may occur in the data sequence, but also detects any error that may occur in the status bit. It should be appreciated that while the method of operation 502 referenced the majority of logical value types in the data sequence as being a logical high value type, this reference is not meant to be limiting. That is, the method of operations listed above may be modified so that the data is encoded if the majority of logical value types are logical low value types.

Tables 1 and 2, through exemplary data, further illustrate the embodiments described above with respect to FIG. 5 and FIG. 3.

TABLE 1

| | | |
|---|---|---|
| D | 1111.1111.0011.1000 | 16-bit data with 11 logic 1s |
| I | 0000.0000.1100.0111 | inverted |
| S | 1 | indicates the data are inverted |
| J | 1.0000.0000.1100.0111 | J = {S , I } |
| P | 0 | number of logic 1s in J is 6, an even number |
| M | 01.0000.0000.1100.0111 | M = {P , J }, with 6 logic 1s |

Table 1 shows data D' to be a 16 bit data value having 11 bits with logical high values, i.e., 1s. As described above in operation 504, the raw data D' are encoded because the majority of the bits 11/16 in raw data D' is a logical high value. One skilled in the art will appreciate that the logic values of the majority of bits can be counted through various means. For example, the counting can be done through an adder, comparator, counter, etc. The exemplary encoding scheme used herein is to invert the data. By inverting, the bits in raw data D' resulted in data I'. As can be seen, in data I', only 5 bits out of the 16 bits are logical high values. Since the data D' are inverted, the status bit S' is set to a logical high value, i.e., 1, to indicate that the data are encoded. Of course, the status bit S' may be set to a logical low value to indicate the data are encoded under an alternative convention. Status bit S' with the encoded data I' combine to define data J'. Data J' include 17 bits. Further, the parity generator in the example is assumed to be an odd parity generator. Thus, parity bit P' is set to logic 0 because the number of logic 1s in data J' is even, i.e. 6. As mentioned earlier, with reference to FIG. 3, data M' are generated by combining data J' with the parity bit P'. One of the advantages of presenting data M' to external memory interface bus is that the parity bit P' is computed based on the number of logic 1s in data J' where data J' include encoded data I' and status bit S'. Thus, the status bit S' is included in the error detection process so that any error that may occur to status bit S' as well as the data I' may be detected. Additionally, data M' only includes 6 logic 1s, therefore, less than half of the bits in the data M' will be simultaneously switching states from logic 1 to logic 0 or logic 0 to 1.

To illustrate the optimizing process further, three exemplary data sequences are shown below. The three data sequences are sent to the external memory at first, second and third clock cycle respectively. The exemplary first data sequence is 1111,1111,1000,0000. The exemplary second data sequence is 0000,0000,0010,0111. The exemplary third data sequence is 1111,1111,1010,0010. As described above, since the majority of bits in the first and the third data sequences are logic 1s the bits are encoded. For exemplary purpose, the data sequences are encoded by inverting the bits. When the bits are inverted the first data sequence became 0000,0000,0111,1111, and the third data sequence became 0000,0000,0101,1101. The second data sequence will not be inverted since the majority of the bits in the second data sequences are not logic 1s. Therefore, the unencoded second data sequence will be sent to the external memory interface bus. At the first clock cycle, the encoded first data sequence are sent to the external memory interface bus, i.e., 0,1,0000, 0000,0111,1111 along with the status bit set to logical 1 and the parity bit set to logical 0. At the second clock cycle, the unencoded second data sequence, i.e., 0,0,0000,0000,0010, 0111 is sent to the external memory interface bus with the status bit and the parity bit set to logical 0. When comparing bits in the corresponding bit positions between the encoded first data sequence and the second data sequence, it can be seen that only 4 bits are different. Thus, in this example, the state change occurs only for those 4 bits that are different and there is no state change for the rest of the bits.

Similarly, when the encoded third sequence 0,1,0000,0000,0101,1101 is presented to the external memory interface bus, only those bits in the corresponding bit positions that are different from the second data sequence will change states. In this example, there are 6 bits that are different between the second data sequence and the third encoded data sequence, which implies there are 6 bits that will change state simultaneously. However, among the 6 bits that are different, four of them are changing states from logic 0 to logic 1 and the other two are changing states from logic 1 to logic 0. State changes from logic 1 to logic 0 i.e., a logical high state to a logical low state, do not have the same effect on the circuit as state changes from logic 0 to logic 1, i.e., a logical low state to a logical high state. Even though both state changes are a form of SSO effect, the effects of these two changes do not add. In some instances, the two different logic state changes may cancel each other. The worst SSO effect is experienced when a large number of state changes occur in the same direction. Therefore, in this example, the possible worst SSO effect is due to the four bits changing state from logic 1 to logic 0.

TABLE 2

| | | |
|---|---|---|
| D | 1111.0000.1111.0000 | 16-bit data with 8 logic 1s |
| I | 1111.0000.1111.0000 | not inverted |
| S | 0 | indicates the data are not inverted |
| J | 0.1111.0000.1111.0000 | J = {S , I } |
| P | 0 | number of logic 1s in J is 8, an even number |
| M | 00.1111.0000.1111.0000 | M = {P , J }, with 8 logic 1s |

Table 2 illustrates, through exemplary data, the embodiments described above with respect to FIG. 5 and FIG. 3 for the worst-case scenario. In table 2, the raw data D' that are being sent to the external memory contain an equal number of logic 1s and logic 0s. In this example, there are eight logic 1s and eight logic 0s. Since the data do not contain majority of logic 1s, the data are not encoded. Therefore, the data I' remain the same as the raw data D'. As the data are not encoded, status bit S' is set to logic 0. Data J' include both the raw data I' and status bit S'. As the number of logic 1s in data J' is even, the parity bit is set to logic 0. The optimized resulting data M', which are to be presented to the external memory interface bus include eight logical high values. As can be seen, in the worst case scenario, only 8 bits out of the 18 bits in data M' are logic 1s, which is $4/9^{ths}$ of the number bits in data M'. Therefore, in the worst case, only $4/9^{ths}$ of the total bits can switch states simultaneously from logic 1 to logic 0.

As can be seen, the embodiments described above, can prevent signal degradation caused by SSO effect. The SSO effect is reduced by encoding the data based on the number of logical high values in the data. Also, the embodiments described above are able to detect errors in the status bit by having the parity bit generator in series with the encoder. The parity bit is generated subsequent to the encoder setting the status bit to a particular logical value. Consequently, the data, from which the parity bit is generated, include the status bit. Thus, the status bit is included in the error detection scheme.

The embodiments, thus far, were described with respect to PLDs. The method and system, for improving external memory interface bus data integrity, described herein may be incorporated into any suitable integrated circuit. For example, the method and system may be incorporated into other types of programmable logic devices such as programmable array logic (PA-L), programmable logic array (PLA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operations, unless explicitly stated in the claims.

What is claimed is:

1. An integrated circuit (IC) providing optimized data presentation to an external memory interface bus, comprising:
   an encoder for encoding data to be sent to an external memory the encoder being activated to minimize a simultaneous switching output effect;
   a parity generator connected in series with the encoder;
   a parity checker; and
   a decoder for decoding the data connected in series with the parity checker.

2. The IC of claim 1, wherein the encoder is an inverter.

3. The IC of claim 1, wherein the parity generator is one of an odd parity generator or an even parity generator.

4. The IC of claim 1, wherein the encoder sets a status bit to indicate encoding of the data.

5. The IC of claim 1, wherein the parity generator includes one of a counter, an adder, or a comparator to count logical high values in the data and the status bit, the parity generator sets a parity bit based on a number of logical high values in the data and the status bit.

6. The IC of claim 1, wherein the IC is a programmable logic device (PLD), wherein the PLD is selected from a group consisting of devices such as field programmable gate array (FPGA), programmable array logic (PAL), programmable logic array (PLA), field programmable logic array (FPLA), electrically programmable logic devices (EPLD), electrically erasable programmable logic device (EEPLD), and logic cell array (LCA).

* * * * *